US008286772B2

(12) United States Patent
Eisengruber (10) Patent No.: US 8,286,772 B2
(45) Date of Patent: Oct. 16, 2012

(54) CONTROLLABLE COUPLING ASSEMBLY AND OVERRUNNING COUPLING AND CONTROL ASSEMBLY UTILIZING SAME

(75) Inventor: Gregory M. Eisengruber, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 449 days.

(21) Appl. No.: 12/723,986

(22) Filed: Mar. 15, 2010

(65) Prior Publication Data
US 2010/0252384 A1  Oct. 7, 2010

Related U.S. Application Data (60) Provisional application No. 61/211,608, filed on Apr. 1, 2009.

(51) Int. Cl.
*F16D 41/16* (2006.01)

(52) U.S. Cl. ............ 192/43.1; 192/46; 192/47; 192/69.1

(58) Field of Classification Search .............. 192/43.1, 192/47, 69.1
See application file for complete search history.

(56) References Cited

U.S. PATENT DOCUMENTS

| 4,050,560 | A |   | 9/1977  | Torstenfelt |        |
| 5,362,293 | A |   | 11/1994 | Romanauskas |        |
| 5,638,929 | A |   | 6/1997  | Park        |        |
| 5,678,668 | A |   | 10/1997 | Sink        |        |
| 5,699,889 | A | * | 12/1997 | Gadd ................ | 192/35 |
| 5,918,715 | A |   | 7/1999  | Ruth et al. |        |
| 5,927,455 | A |   | 7/1999  | Baker et al. |       |
| 6,193,038 | B1 |  | 2/2001  | Scott et al. |       |
| 6,244,965 | B1 |  | 6/2001  | Klecker et al. |     |
| 6,290,044 | B1 |  | 9/2001  | Burgman et al. |     |
| 6,814,201 | B2 |  | 11/2004 | Thomas      |        |
| 6,830,531 | B1 |  | 12/2004 | Koenig et al. |      |
| 6,905,009 | B2 | * | 6/2005  | Reed et al. ................ | 192/43.1 |
| 7,198,587 | B2 |  | 4/2007  | Samie et al. |       |
| 7,258,214 | B2 |  | 8/2007  | Pawley et al. |      |
| 7,275,628 | B2 |  | 10/2007 | Pawley et al. |      |
| 7,344,010 | B2 |  | 3/2008  | Fetting, Jr. et al. | |
| 7,464,801 | B2 |  | 12/2008 | Wittkopp    |        |
| 7,484,605 | B2 |  | 2/2009  | Pawley et al. |      |
| 2002/0027055 | A1 | | 3/2002 | Le-Calve et al. |   |
| 2006/0185957 | A1 | | 8/2006 | Kimes et al. |      |
| 2006/0278486 | A1 | | 12/2006 | Pawley et al. |    |
| 2007/0278061 | A1 | | 12/2007 | Witkopp et al. |   |
| 2008/0110715 | A1 | | 5/2008 | Pawley      |        |

(Continued)

OTHER PUBLICATIONS

International Search Report and Written Opinion of the International Searching Authority; International Application No. PCT/US2010/027566; date of mailing May 14, 2010.

*Primary Examiner* — Richard M. Lorence
(74) *Attorney, Agent, or Firm* — Brooks Kushman P.C.

(57) ABSTRACT

A controllable coupling assembly including a coupling member and an overrunning coupling and control assembly utilizing same are provided wherein a set of actuators are supported on a control member of the assembly for movement therewith to move or pivot respective struts received within pockets of the coupling member. Apparatus is responsive to a control pressure signal to exert a control force on the control member to cause the control member to move from its first position which corresponds to a first mode of the coupling assembly to its second position which corresponds to a second mode of the coupling assembly. The coupling assembly may be an overrunning clutch assembly.

21 Claims, 4 Drawing Sheets

U.S. PATENT DOCUMENTS

| | | |
|---|---|---|
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0205918 A1* | 8/2009 | Samie et al. ................ 192/43.1 |
| 2009/0211863 A1 | 8/2009 | Kimes |

* cited by examiner

CONTROLLABLE COUPLING ASSEMBLY AND OVERRUNNING COUPLING AND CONTROL ASSEMBLY UTILIZING SAME

CROSS-REFERENCE TO RELATED APPLICATIONS

This application claims the benefit of U.S. provisional application entitled "Spring-Actuated One-Way Clutch (OWC) Or Coupling Subassembly And Assembly Utilizing Same" filed Apr. 1, 2009 and having U.S. Ser. No. 61/211,608.

BACKGROUND OF THE INVENTION

1. Field of the Invention

This invention relates to overrunning, one-way clutches or coupling subassemblies and assemblies utilizing same especially for use in vehicular automatic transmissions.

2. Background Art

A typical one-way clutch consists of an inner ring, an outer ring and a locking device between the two rings. The one-way clutch is designed to lock in one direction and to allow free rotation in the other direction. Two types of one-way clutches often used in vehicular, automatic transmissions include:

- Roller type which consists of spring loaded rollers between the inner and outer race of the one-way clutch. (Roller type is also used without springs on some applications); and
- Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing freewheeling of the strut plate in the overrun direction.

U.S. Pat. No. 7,258,214 discloses an overrunning coupling assembly and a method of controlling the engagement of planar first and second members wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

U.S. Pat. No. 7,344,010 discloses an overrunning coupling assembly and a method of controlling the engagement of planar first and second members wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

U.S. Pat. No. 7,484,605 discloses an overrunning radial coupling assembly or clutch and a method of controlling the engagement of inner and outer plates or members of the assembly wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

Other related U.S. patent publications include: U.S. 2009/0211863; 2009/0159391; 2008/0223681; 2008/0110715;

2008/0169166; 2008/0185253; 2007/0278061; 2006/0185957; and the following U.S. Pat. Nos. 7,464,801; 7,275,628; 7,198,587; 6,814,201; 6,193,038; 4,050,560; 5,638,929; 5,362,293; 5,678,668 and 5,918,715.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF THE INVENTION

An object of at least one embodiment of the present invention is to provide an improved controllable coupling assembly and overrunning coupling and control assembly utilizing same wherein there is no need for a control element or plate mounted for controlled shifting movement between and relative to the surfaces of first and second coupling members or plates.

In carrying out the above object and other objects of at least one embodiment of the present invention, a controllable coupling assembly is provided. The assembly includes first and second coupling members supported for rotation relative to one another about a common rotational axis. The first coupling member has a coupling first face oriented to face axially in a first direction along the rotational axis. The second coupling member has a coupling second face opposed to the first face and oriented to face axially in a second direction along the rotational axis. The second coupling member has a third face spaced from the second face and oriented to face axially in the first direction. The second face has a set of pockets spaced about the rotational axis. Each pocket of the set has a strut received thereby. The first face has a set of locking formations that are engaged by the struts upon projecting outwardly from the set of pockets to prevent relative rotation of the first and second coupling members with respect to each other in at least one direction about the axis. The third face having a set of passages spaced about the rotational axis and in communication with their respective pockets. The assembly also includes a control member mounted for controlled shifting movement along the rotational axis relative to the second coupling member between a first position which corresponds to a first mode of the coupling assembly and a second position which corresponds to a second mode of the coupling assembly. The assembly further includes a set of actuators supported on the control member to move therewith. Each passage of the set of passages has an actuator received thereby to actuate its respective strut within its respective pocket so that its respective strut moves into contact with the locking formations to couple the first and second coupling members for rotation with each other in at least one direction about the rotational axis in one of the positions of the control member. The assembly finally includes at least one biasing member which exerts a biasing force on the control member along the rotational axis A control force causes the control member to move from its first position to its second position along the rotational axis against the biasing force of the at least one biasing member. In the absence of the control force the at least one biasing member moves the control member from the second position back to the first position along the rotational axis.

Each of the struts may have an end that is pivotally movable outwardly of its respective pocket.

The assembly may further include a set of biasing members that bias their respective struts against pivotal movement of their respective ends out of their respective pockets toward the locking formations. The set of actuators pivot the ends of their respective struts against the bias of the set of biasing members and into contact with the locking formations to couple the first and second coupling members for rotation with each other in the at least one direction about the rotational axis. The set of biasing members are configured to move the ends of each respective strut back into their respective pockets to permit relative rotation of the coupling members in the at least one direction about the rotational axis.

The at least one biasing member may be disposed between the second coupling member and the control member to urge the control member towards its first position.

The first position may be an overrun position, the first mode may be an overrun mode, the second position may be a locked position and the second mode may be a locked mode.

The struts may include at least one reverse strut and at least one forward strut.

The assembly may further include an element supported between the first and second coupling members. The element has at least one opening extending completely therethrough to allow the forward and reverse struts to extend therethrough at the same time and fully lock the coupling members together to prevent relative rotation between the coupling members in either direction about the rotation axis.

The third face may have a set of formations spaced about the rotational axis. The control member may have a corresponding set of apertures for receiving the set of formations therein to guide the shifting movement of the control member.

The set of actuators may include springs.

The first, second and third faces may be generally flat and face generally axially.

The first, second and third faces may be generally annular and extend generally radially with respect to the rotational axis.

Further in carrying out the above object and other objects at least one embodiment of the present invention, a controllable overrunning clutch assembly is provided. The assembly includes first and second clutch members supported for rotation relative to one another about a common rotational axis. The first clutch member has a coupling first face oriented to face axially in a first direction along the rotational axis and the second clutch member has a coupling second face opposed to the first face and oriented to face axially in a second direction along the rotational axis. The second clutch member has a third face spaced from the second face and oriented to face axially in the first direction. The second face has a set of pockets spaced about the rotational axis. Each pocket of the set has a pivotal strut received thereby and a spring that privotally biases its strut inwardly therein. The first face has a set of locking formations that are engaged by the struts upon pivoting outwardly from the set of pockets to prevent relative rotation of the first and second clutch members with respect to each other in at least one direction about the axis. The third face has a set of passages spaced about the rotational axis and in communication with their respective pockets. The assembly further includes a control member mounted for controlled shifting movement along the rotational axis relative to the second clutch member between a first position which corresponds to a first mode of the clutch assembly and a second position which corresponds to a second mode of the clutch assembly. The assembly also includes a set of actuators supported on the control member to move therewith. Each passage of the set of passages has an actuator received thereby to actuate its respective strut within its respective pocket so that its respective strut pivots into contact with the locking formations to couple the first and second clutch members for rotation with each other in at least one direction about the rotational axis in one of the positions of the control member. The assembly further includes at least one biasing member which exerts a biasing force on the control member along the rotational axis. A control force causes the control member to move from its first position to its second position along the rotational axis against the biasing force of the at least one biasing member. In the absence of the control force the at least one biasing member moves the control member from the second position back to the first position along the rotational axis.

The set of actuators may pivot ends of their respective struts against the bias of their respective springs and into contact with the locking formations to couple the first and second coupling members for rotation with each other in the at least one direction about the rotational axis. The springs may be configured to move the ends of each respective strut back into their respective pockets to permit relative rotation of the coupling members in the at least one direction about the rotational axis.

The at least one biasing member may be disposed between the second clutch member and the control member to urge the control member towards its first position.

The first position may be an overrun position, the first mode may be an overrun mode, the second position may be a locked position and the second mode may be a locked mode.

The struts may include at least one reverse strut and at least one forward strut.

The assembly may further include an element supported between the first and second clutch members. The element has at least one opening extending completely therethrough to allow the forward and reverse struts to extend therethrough at the same time and fully lock the clutch members together to prevent relative rotation between the clutch members in either direction about the rotation axis.

The third face may have a set of formations spaced about the rotational axis. The control member may have a corresponding set of apertures for receiving the set of formations therein to guide the shifting movement of the control member.

The set of actuators may include springs.

Still further in carrying out the above object and other objects of at least one embodiment of the present invention, an overrunning coupling and control assembly is provided. The assembly includes first and second coupling members supported for rotation relative to one another about a common rotational axis. The first coupling member has a coupling first face oriented to face axially in a first direction along the rotational axis and the second coupling member has a coupling second face opposed to the first face and oriented to face axially in a second direction along the rotational axis. The second coupling member has a third face spaced from the second face and oriented to face axially in the first direction. The second face has a set of pockets spaced about the rotational axis. Each pocket of the set having a strut received thereby. The first face has a set of locking formations that are engaged by the struts upon projecting outwardly from the set of pockets to prevent relative rotation of the first and second coupling members with respect to each other in at least one direction about the axis. The third face has a set of passages spaced about the rotational axis and in communication with their respective pockets. The assembly also includes a control member mounted for controlled shifting movement along the rotational axis relative to the second coupling member between a first position which corresponds to a first mode of the coupling assembly and a second position which corresponds to a second mode of the coupling assembly. The assembly further includes a set of actuators supported on the control member to move therewith. Each passage of the set of passages has an actuator received thereby to actuate its respective strut within its respective pocket so that its respective strut moves into contact with the locking formations to couple the first and second coupling members for rotation with each other in at least one direction about the rotational axis in one of the positions of the control member. The assembly still further includes at least one control member biasing member which exerts a biasing force on the control member along the rotational axis. A control force causes the control member to move from its first position to its second position along the rotational axis against the biasing force of the at least one control member biasing member. In the absence of the control force the at least one control member biasing member moves the control member from the second position back to the first position along the rotational axis. Finally, the assembly also includes apparatus responsive to a control pressure signal to exert the control force on the control member.

The apparatus may include a housing having an inner surface which defines a bore within the housing. The apparatus may also include a hollow piston having an inner surface which defines a cavity. The piston may include first and second piston parts disposed within the bore of the housing. The second piston part may be an outer surface in sliding contact with the inner surface of the housing. The piston parts may be movable relative to one another. The apparatus may further include at least one piston biasing member disposed within the cavity which exerts a biasing force on the second piston part. A control pressure signal within the housing and against the outer surface of the second piston part causes the second piston part to slide within the bore against the biasing force of the at least one piston biasing member until a portion of the second piston part exerts the control force on the control member.

Objects, features, and advantages of the present invention are readily apparent from the following detailed description of the best mode for carrying out the invention when taken in connection with the accompanying drawings and in view of the prior art.

DETAILED DESCRIPTION OF THE PREFERRED EMBODIMENT(S)

A controllable one-way clutch or coupling subassembly or assembly constructed in accordance with at least one embodiment of the present invention is generally included at 10 in FIGS. 1-6. The assembly 10 includes an annular pocket plate, generally indicated at 12. An outer axially-extending surface 14 of the plate 12 has external splines 16.

An inner radially extending face or surface 18 of the plate 12 is formed with spaced reverse pockets 20, in which reverse struts 22 are received and retained. One end portion of each reverse strut 22 is normally biased outwardly by a coil spring 25 (FIG. 5) disposed with an aperture 21 of the pocket 20. The opposite end portion of each reverse strut 22 is controllably biased by a spring 24 when an annular biasing plate 32 on which the springs 24 are supported moves (upon receiving a control force) towards the opposite end portion of the strut 22 within a passage 19 in communication with the pocket 20 to overcome the bias of the springs 25. Preferably, six reverse struts 22 are provided. However, it is to be understood that a greater or lesser member of reverse struts may be provided.

The face or surface 18 of the pocket plate 12 is also formed with spaced forward pockets 26 in which forward struts 28 are received and retained. Like the reverse struts 22, one end portion of each forward strut 28 is normally biased outwardly by a coil spring disposed within an aperture of the plate 26. The opposite end portions of the struts 28 are controllably biased outwardly by coil springs 30 when the plate 32 on which the springs 30 are supported move towards the opposite end portion of the strut 28 to overcome the bias of its coil spring. Preferably, six forward struts 28 are provided. However, it is to be understood that a greater or lesser number of forward struts may be provided. Also, it is to be understood that, instead of springs the plate 32 may support other types of strut actuators such as pins to move therewith.

The annular biasing plate 32 has a plurality of spaced circular apertures 34 in which are received and retained a like plurality of spaced formations 36 formed on an outer radially extending face or surface 38 of the plate 12. A plurality of spring supports 40 are formed on an inner surface 42 of the plate 32 to support the springs 24 and 30. The biasing 32 plate also supports a plurality of biasing coil springs 44 which extend between the inner surface 42 of the plate 32 and apertures 45 formed in the surface 38 of the plate 12 to bias the two plates 32 and 12 apart. However, it is to be understood that instead of biasing the plates 32 and 12 apart biasing springs may be provided to bias the plates 32 and 12 together in which case the springs 24 and 30 normally urge the struts 22 and 28, respectively, outwardly in the absence of a control force on the plate 32. In this case, a control force on the plate 32 would cause the plate 32 to move away from the plate 12 so that the springs 24 and 30 don't bias the struts 22 and 28, respectively, outwardly.

The subassembly 10 also includes a ring 50 which is disposed in a groove 52 formed in an inner axial surface 54 of the plate 12 to hold the biasing plate 32 within the pocket plate 12.

The subassembly 10 also includes a plate or element, generally indicated at 60, having a plurality of spaced apertures 62 extending completely therethrough to allow the reverse struts 22 and the forward struts 28 to pivot in their pockets 20 and 26, respectively, (by the biasing action of the springs 24 and 30, respectively) and extend through their corresponding apertures 62 to engage spaced locking formations or notches 70 formed in a radially extending face or surface 72 (FIG. 5) of a notch plate, generally indicated at 74. The struts 22 or 28 engage the locking formations 70 during movement of the plate 32 towards the plate 12 along a common rotational axis 76. The plate 74 is permitted to rotate relative to and within the plate 12 about the axis 76.

The plate 60 is prevented from rotating within the plate 12 by shoulders 61 circumferentially spaced about the outer periphery of the plate 60 to fit within corresponding apertures 63 formed in an inner axial surface 65 of the plate 12.

A snap ring 80 is disposed within a groove 82 formed in the axial surface 65 to retain the notch plate 74 in the plate 12. The ring 80 holds the plates 74, 60 and 12 together and limit axial movement of the plates (except the plate 32) relative to one another. An inner axially extending surface 75 of the plate 74 has internal splines 77.

The forward struts 28 lock the notch plate 74 to the pocket plate 12 in one direction of relative rotational movement about the axis 76 but allow free-wheeling in the opposite direction about the axis 76. The reverse struts 22 perform the same locking function in the opposite direction.

Figure 1:
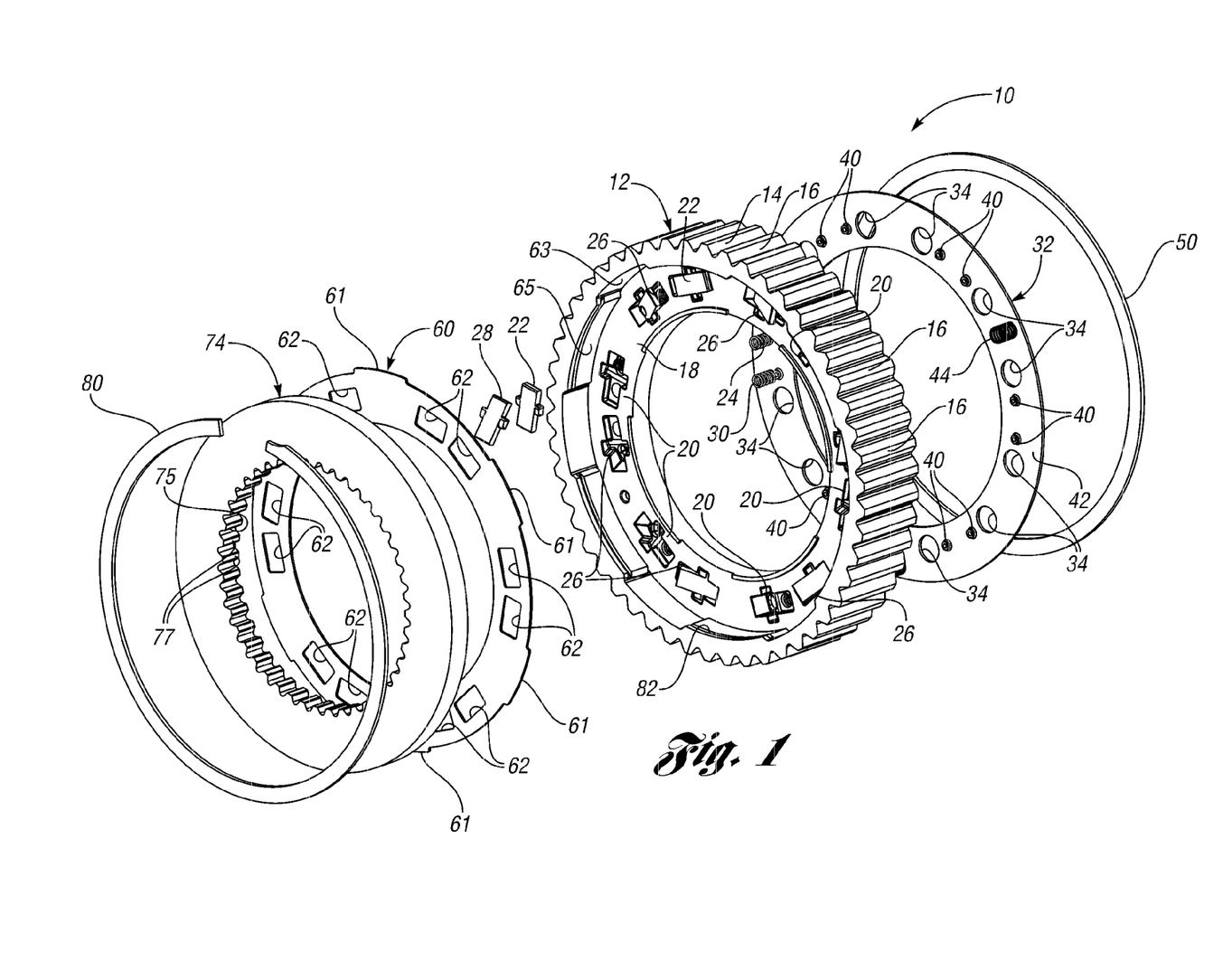
FIG. 1 is an exploded perspective view of a controllable coupling assembly constructed in accordance with at least one embodiment of the present invention.
Figures 2, 3, 4, 5, 6:
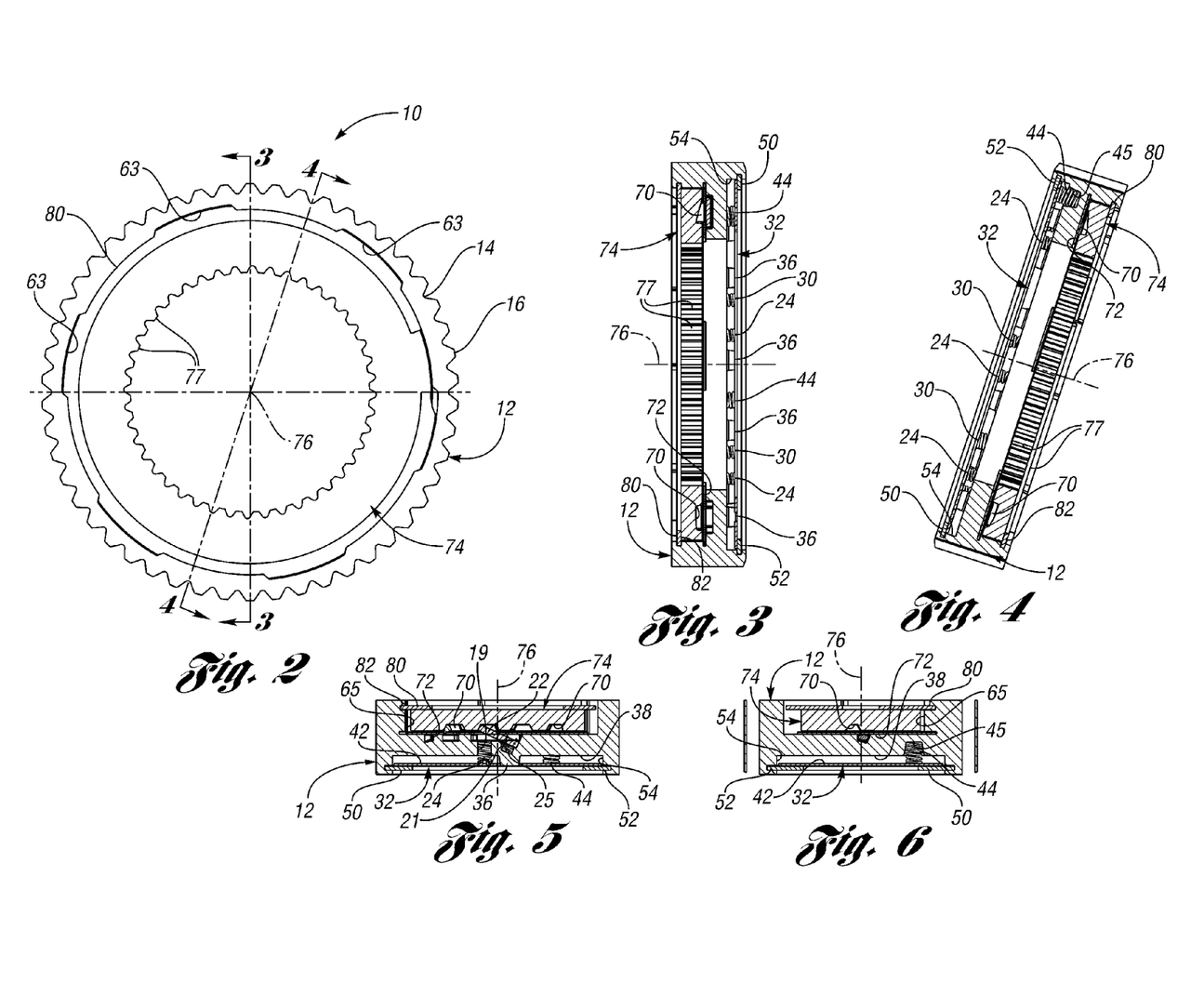
FIG. 2 is a top plan view of the assembly of FIG. 1.
FIG. 3 is a sectional view of the assembly taken along lines 3-3 of FIG. 2.
FIG. 4 is a sectional view of the assembly taken along lines 4-4 of FIG. 2.
FIG. 5 is a sectional view of the assembly of FIGS. 1 and 2.
FIG. 6 is another sectional view of the assembly of FIGS. 1 and 2.
Figure 7:
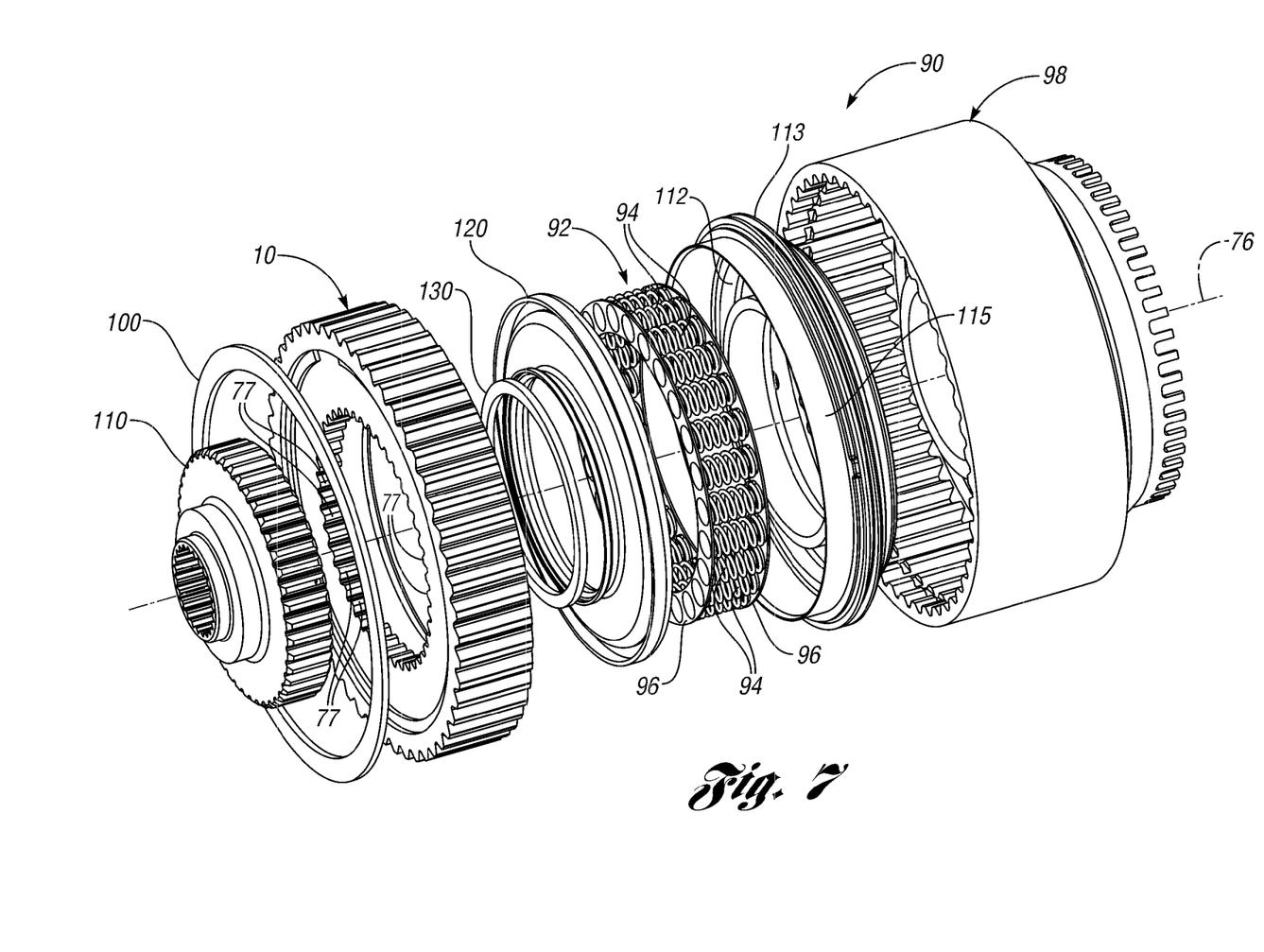
FIG. 7 is an exploded perspective view of an overrunning coupling and control assembly including the assembly of FIGS. 1 and 2 constructed in accordance with at least one embodiment of the present invention.
Figure 8:
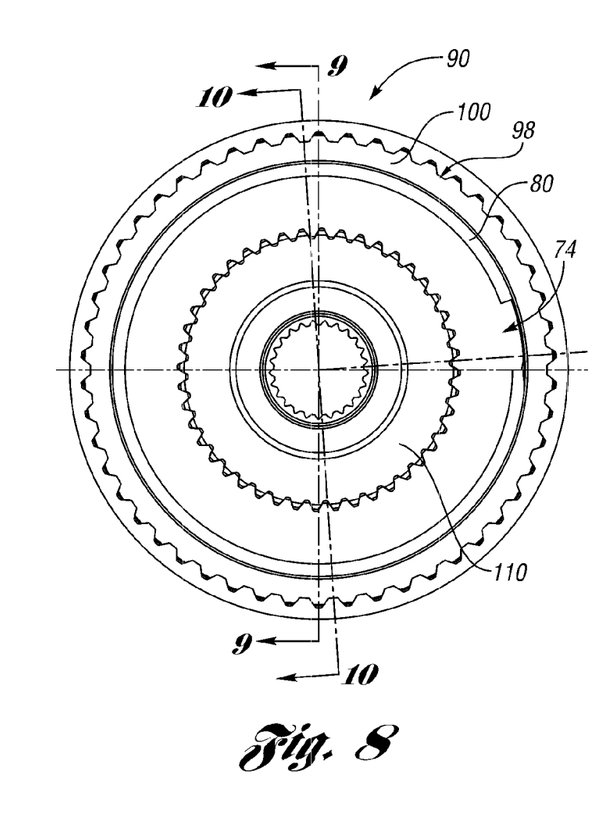
FIG. 8 is a top plan view of the assembly of FIG. 7.

FIG. 5 is another sectional view of the subassembly 10 with a reverse strut 22 extending into a notch 70 to lock the plates 74 and 12 together with respect to one direction of rotational movement.

Referring now to FIGS. 7-10, there is illustrated an assembly, generally indicated at 90 including the assembly or subassembly 10, which is designed to replace a friction clutch assembly in a vehicular automotive transmission (not shown). The assembly 90 includes a housing, generally included at 98, and a spring plate subassembly, generally indicated at 92, which includes a plurality of compression springs 94 disposed between plates 96. The spring plate subassembly 92 is housed within space 112 of a hollow piston formed by piston parts or halves 113 and 120. The piston half 113 is slidably mounted within a bore of the housing 98 by a piston ring (now shown).

The spring plate subassembly 92 and piston halves 113 and 120 are held within the internally splined housing 98 of the assembly 90 by a ring 100. An externally as well as internally splined member 110 is in driving engagement with splines 77 of the subassembly 10.

An axially extending wall portion 115 of the piston half 113 moves axially towards the plate 32 of the subassembly 10 against the biasing action of the springs 94 by a control force external on the outer surface of the piston half 113 by a fluid such as a hydraulic fluid to, in turn, axially move the plate 32 with its supported springs 24 and 30 towards the plate 12 against the biasing action of the springs 44. In particular, when an outer surface 114 of the piston half 113 receives a control pressure such as by hydraulic fluid, the springs 94 of the spring plate subassembly 92 try to counteract the fluid force. In the absence of a control pressure, the springs 94 move the piston half 113 away from the plate 32 thereby allowing the springs 44 to move the plate 22 to its initial position.

Figure 9:
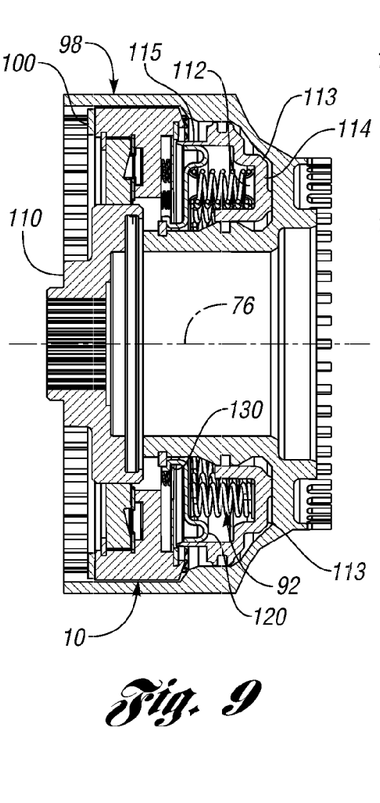
FIG. 9 is a sectional view of the assembly of FIG. 8 taken along lines 9-9 of FIG. 8.
Figure 10:
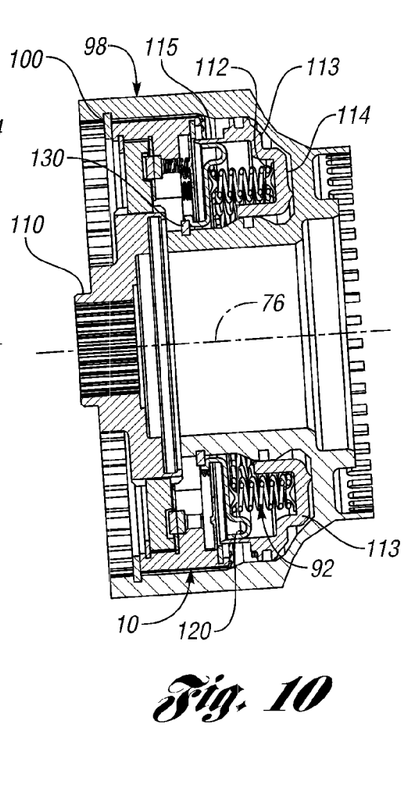
FIG. 10 is a sectional view of the assembly of FIG. 8 taken along lines 10-10 of FIG. 8.

FIGS. 9 and 10 are views, in cross-section, which shows the piston half 113 in its right most position prior to the application of the control fluid. Upon the application of the control fluid, the piston half 113 moves to its left most position wherein the wall 115 exerts a pressure against the spring plate 32 thereby compressing springs 44 and causing springs 24 and 30 to bias their struts 22 and 28, respectively, to engage the notches 70.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A controllable coupling assembly comprising:
   first and second coupling members supported for rotation relative to one another about a common rotational axis, the first coupling member having a coupling first face oriented to face axially in a first direction along the rotational axis and the second coupling member having a coupling second face opposed to the first face and oriented to face axially in a second direction along the rotational axis, the second coupling member having a third face spaced from the second face and oriented to face axially in the first direction;

the second face having a set of pockets spaced about the rotational axis, each pocket of the set having a strut received thereby;

the first face having a set of locking formations that are engaged by the struts upon projecting outwardly from the set of pockets to prevent relative rotation of the first and second coupling members with respect to each other in at least one direction about the axis;

the third face having a set of passages spaced about the rotational axis and in communication with their respective pockets;

a control member mounted for controlled shifting movement along the rotational axis relative to the second coupling member between a first position which corresponds to a first mode of the coupling assembly and a second position which corresponds to a second mode of the coupling assembly;

a set of actuators supported on the control member to move therewith, each passage of the set of passages having an actuator received thereby to actuate its respective strut within its respective pocket so that its respective strut moves into contact with the locking formations to couple the first and second coupling members for rotation with each other in at least one direction about the rotational axis in one of the positions of the control member; and at least one biasing member exerts a biasing force on the control member along the rotational axis wherein a control force causes the control member to move from its first position to its second position along the rotational axis against the biasing force of the at least one biasing member and wherein in the absence of the control force the at least one biasing member moves the control member from the second position back to the first position along the rotational axis.

2. The assembly as claimed in claim 1, wherein each of the struts has an end that is pivotally movable outwardly of its respective pocket.

3. The assembly as claimed in claim 2, further comprising a set of biasing members that bias their respective struts against pivotal movement of their respective ends out of their respective pockets toward the locking formations wherein the set of actuators pivot the ends of their respective struts against the bias of the set of biasing members and into contact with the locking formations to couple the first and second coupling members for rotation with each other in the at least one direction about the rotational axis and wherein the set of biasing members are configured to move the ends of each respective strut back into their respective pockets to permit relative rotation of the coupling members in the at least one direction about the rotational axis.

4. The assembly as claimed in claim 1, wherein the at least one biasing member is disposed between the second coupling member and the control member to urge the control member towards its first position.

5. The assembly as claimed in claim 1, wherein the first position is an overrun position, the first mode is an overrun mode, the second position is a locked position and the second mode is a locked mode.

6. The assembly as claimed in claim 1, wherein the struts include at least one reverse strut and at least one forward strut.

7. The assembly as claimed in claim 6, further comprising an element supported between the first and second coupling members, the element having at least one opening extending completely therethrough to allow the forward and reverse struts to extend therethrough at the same time and fully lock the coupling members together to prevent relative rotation between the coupling members in either direction about the rotation axis.

8. The assembly as claimed in claim 1, wherein the third face has a set of formations spaced about the rotational axis and wherein the control member has a corresponding set of apertures for receiving the set of formations therein to guide the shifting movement of the control member.

9. The assembly as claimed in claim 1, wherein the set of actuators includes springs.

10. The assembly as claimed in claim 1, wherein the first, second and third faces are generally flat and face generally axially.

11. The assembly as claimed in claim 1, wherein the first, second and third faces are generally annular and extend generally radially with respect to the rotational axis.

12. A controllable overrunning clutch assembly comprising:

first and second clutch members supported for rotation relative to one another about a common rotational axis, the first clutch member having a coupling first face oriented to face axially in a first direction along the rotational axis and the second clutch member having a coupling second face opposed to the first face and oriented to face axially in a second direction along the rotational axis, the second clutch member having a third face spaced from the second face and oriented to face axially in the first direction;

the second face having a set of pockets spaced about the rotational axis, each pocket of the set having a pivotal strut received thereby and a spring that privotally biases its strut inwardly therein;

the first face having a set of locking formations that are engaged by the struts upon pivoting outwardly from the set of pockets to prevent relative rotation of the first and second clutch members with respect to each other in at least one direction about the axis;

the third face having a set of passages spaced about the rotational axis and in communication with their respective pockets;

a control member mounted for controlled shifting movement along the rotational axis relative to the second clutch member between a first position which corresponds to a first mode of the clutch assembly and a second position which corresponds to a second mode of the clutch assembly;

a set of actuators supported on the control member to move therewith, each passage of the set of passages having an actuator received thereby to actuate its respective strut within its respective pocket so that its respective strut pivots into contact with the locking formations to couple the first and second clutch members for rotation with each other in at least one direction about the rotational axis in one of the positions of the control member; and at least one biasing member which exerts a biasing force on the control member along the rotational axis wherein a control force causes the control member to move from its first position to its second position along the rotational axis against the biasing force of the at least one biasing member and wherein in the absence of the control force the at least one biasing member moves the control member from the second position back to the first position along the rotational axis.

13. The assembly as claimed in claim 12, wherein the set of actuators pivot ends of their respective struts against the bias of their respective springs and into contact with the locking formations to couple the first and second coupling members for rotation with each other in the at least one direction about the rotational axis and wherein the springs are configured to move the ends of each respective strut back into their respective pockets to permit relative rotation of the coupling members in the at least one direction about the rotational axis.

14. The assembly as claimed in claim 12, wherein the at least one biasing member is disposed between the second clutch member and the control member to urge the control member towards its first position.

15. The assembly as claimed in claim 12, wherein the first position is an overrun position, the first mode is an overrun mode, the second position is a locked position and the second mode is a locked mode.

16. The assembly as claimed in claim 12, wherein the struts include at least one reverse strut and at least one forward strut.

17. The assembly as claimed in claim 16, further comprising an element supported between the first and second clutch members, the element having at least one opening extending completely therethrough to allow the forward and reverse struts to extend therethrough at the same time and fully lock the clutch members together to prevent relative rotation between the clutch members in either direction about the rotation axis.

18. The assembly as claimed in claim 12, wherein the third face has a set of formations spaced about the rotational axis and wherein the control member has a corresponding set of apertures for receiving the set of formations therein to guide the shifting movement of the control member.

19. The assembly as claimed in claim 12, wherein the set of actuators includes springs.

20. An overrunning coupling and control assembly comprising:
first and second coupling members supported for rotation relative to one another about a common rotational axis, the first coupling member having a coupling first face oriented to face axially in a first direction along the rotational axis and the second coupling member having a coupling second face opposed to the first face and oriented to face axially in a second direction along the rotational axis, the second coupling member having a third face spaced from the second face and oriented to face axially in the first direction;
the second face having a set of pockets spaced about the rotational axis, each pocket of the set having a strut received thereby;
the first face having a set of locking formations that are engaged by the struts upon projecting outwardly from the set of pockets to prevent relative rotation of the first and second coupling members with respect to each other in at least one direction about the axis;
the third face having a set of passages spaced about the rotational axis and in communication with their respective pockets;
a control member mounted for controlled shifting movement along the rotational axis relative to the second coupling member between a first position which corresponds to a first mode of the coupling assembly and a second position which corresponds to a second mode of the coupling assembly;
a set of actuators supported on the control member to move therewith, each passage of the set of passages having an actuator received thereby to actuate its respective strut within its respective pocket so that its respective strut moves into contact with the locking formations to couple the first and second coupling members for rotation with each other in at least one direction about the rotational axis in one of the positions of the control member;
at least one control member biasing member which exerts a biasing force on the control member along the rotational axis wherein a control force causes the control member to move from its first position to its second position along the rotational axis against the biasing force of the at least one control member biasing member and wherein in the absence of the control force the at least one control member biasing member moves the control member from the second position back to the first position along the rotational axis; and
apparatus responsive to a control pressure signal to exert the control force on the control member.

21. The assembly as claimed in claim 20, wherein the apparatus includes:
a housing having an inner surface which defines a bore within the housing;
a hollow piston having an inner surface which defines a cavity, the piston including first and second piston parts disposed within the bore of the housing, the piston parts being movable relative to one another;
at least one piston biasing member disposed within the cavity which exerts a biasing force on the second piston part wherein a control pressure signal within the housing and against the outer surface of the second piston part causes the second piston part to move within the bore against the biasing force of the at least one piston biasing member until a portion of the second piston part exerts the control force on the control member.

* * * * *